United States Patent
Hong et al.

(10) Patent No.: US 10,514,091 B2
(45) Date of Patent: Dec. 24, 2019

(54) VEHICLE INCLUDING TRANSMISSION APPARATUS

(71) Applicants: Hyundai Motor Company, Seoul (KR); Kia Motors Corporation, Seoul (KR)

(72) Inventors: Gi Beom Hong, Gyeonggi-do (KR); Seunghyun Woo, Seoul (KR); Daeyun An, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 70 days.

(21) Appl. No.: 15/835,841

(22) Filed: Dec. 8, 2017

(65) Prior Publication Data
US 2019/0136963 A1    May 9, 2019

(30) Foreign Application Priority Data
Nov. 3, 2017  (KR) .................. 10-2017-0145633

(51) Int. Cl.
*F16H 59/02*    (2006.01)
(52) U.S. Cl.
CPC ..... *F16H 59/0204* (2013.01); *F16H 59/0278* (2013.01); *F16H 2059/0256* (2013.01)
(58) Field of Classification Search
CPC .. F16H 59/0204; F16H 59/0278; F16H 59/04; F16H 59/044; F16H 59/08; F16H 59/10; F16H 59/105; F16H 2059/026; F16H 2059/082; B60K 20/04
See application file for complete search history.

(56) References Cited

U.S. PATENT DOCUMENTS

| | | | | |
|---|---|---|---|---|
| 1,256,244 A | * | 2/1918 | Mellin ................... | B60K 20/02 74/544 |
| 1,285,351 A | * | 11/1918 | Parsons et al. ........ | B60K 20/02 74/544 |
| 1,719,368 A | * | 7/1929 | Hibbets .................. | B60K 20/02 403/324 |
| 1,743,241 A | * | 1/1930 | Schmidt ................. | B60K 20/02 403/102 |
| 3,707,094 A | * | 12/1972 | Herbenar ............... | B60K 20/02 74/473.34 |

(Continued)

FOREIGN PATENT DOCUMENTS

| | | | | |
|---|---|---|---|---|
| GB | 1390171 A | * | 4/1975 | ............ B60K 20/04 |
| JP | 2009-073375 A | | 4/2009 | |

(Continued)

*Primary Examiner* — Jake Cook
*Assistant Examiner* — T. Scott Fix
(74) *Attorney, Agent, or Firm* — Mintz Levin Cohn Ferris Glovsky and Popeo, P.C.; Peter F. Corless

(57) ABSTRACT

A vehicle including a transmission apparatus is provided to distinguish a difference between an automatic shifting operation and a manual shifting operation. The vehicle includes a shift lever that is configured to receive a gear shift command and a transmission apparatus that is configured to perform a gear shifting operation according to the gear shift command received by the shift lever. The shift lever is rotatable to one side and is configured to receive an automatic gear shift command in a laid-down state and to receive a manual shift command in a standing state.

4 Claims, 13 Drawing Sheets

(56) References Cited

U.S. PATENT DOCUMENTS

| | | | | |
|---|---|---|---|---|
| 5,161,422 A * | 11/1992 | Suman | | B60K 20/04 180/315 |
| 5,528,953 A * | 6/1996 | Steinle | | B60K 20/02 477/99 |
| 5,617,929 A * | 4/1997 | Richardson | | B60K 20/02 180/326 |
| 5,896,778 A * | 4/1999 | Murakami | | F16H 59/04 74/473.25 |
| 6,065,560 A * | 5/2000 | Palmeri | | B60K 20/02 180/326 |
| 6,237,435 B1 * | 5/2001 | Gronhage | | F16H 59/0204 74/471 XY |
| 6,401,564 B1 * | 6/2002 | Lee | | B60K 20/04 200/61.88 |
| 7,640,823 B2 * | 1/2010 | Bowman | | F16H 59/0204 74/471 XY |
| 7,661,505 B2 * | 2/2010 | Spykerman | | B60K 20/02 180/326 |
| 8,235,162 B2 * | 8/2012 | Wihinen | | G05G 1/62 180/334 |
| 8,960,361 B2 * | 2/2015 | Helot | | B60K 20/02 180/326 |
| 9,021,911 B2 * | 5/2015 | Kim | | F16H 59/105 74/473.12 |
| 2004/0159487 A1 * | 8/2004 | Wendeberg | | B60K 20/02 180/315 |
| 2004/0163924 A1 | 8/2004 | Wendeberg et al. | | |
| 2011/0132120 A1 * | 6/2011 | Skogward | | B60K 20/04 74/473.3 |

FOREIGN PATENT DOCUMENTS

| | | |
|---|---|---|
| KR | 10-2012-0037244 A | 4/2012 |
| KR | 10-1585473 B1 | 1/2016 |
| KR | 10-2016-0088566 A | 7/2016 |

* cited by examiner

VEHICLE INCLUDING TRANSMISSION APPARATUS

CROSS-REFERENCE TO RELATED APPLICATION

This application claims the benefit of Korean Patent Application No. 10-2017-0145633, filed on Nov. 3, 2017, the disclosure of which is incorporated herein by reference.

BACKGROUND

1. Field of the Disclosure

The present disclosure relates to a vehicle, more particularly, to a vehicle including a transmission apparatus in which an automatic shifting operation is performed by a sliding operation when a shift lever has been rotated and is in a laid-down state and the manual shifting operation is performed by a sliding operation when the shift lever has been rotated and is in a standing state.

2. Description of the Related Art

Generally, a transmission apparatus is an apparatus configured to transmit power generated by an engine to drive wheels by varying rotational force and speed to be suitable for a state of movement of a vehicle and is classified into a manual transmission apparatus and an automatic transmission apparatus. A driver operating the vehicle is capable of changing a gear shift stage of the manual transmission apparatus or the automatic transmission apparatus to a desired gear shift stage by operating a shift lever mounted on a console surface or a steering wheel near a driver's seat.

The manual transmission apparatus may be operated in which, when the driver selects a gear that corresponds to a state of movement of a vehicle using the shift lever, a movement the driver intends is transmitted to the transmission apparatus through a cable or a rod. The automatic transmission apparatus may be operated in which, when the driver moves the shift lever, an inhibitor switch is operated via a cable to transmit a movement the driver intends to the transmission apparatus. Lately, a shift-by-wire (SBW) type shift lever is being used in vehicles. Unlike a mechanical shift lever, an SBW type shift lever is capable of receiving a gear shift command through various operating methods.

Unlike a conventional mechanical shift lever, an SBW type shift lever has no mechanical cable connection structure and has an advantage in that it is easier to operate due to improved lever operation force and operation feeling. An SBW type shift lever may include a lever type shift lever in which a shift lever protruding from the console surface of the vehicle is operated forward and backward, a dial type shift lever in which a cylindrical shift lever mounted on the console surface of the vehicle is operated by being turned left and right, a column-type shift lever in which a shift lever mounted on a side surface of the steering wheel of the vehicle is vertically operated, a button-type shift lever operated by pressing or engaging a button on which gear shift stages of the vehicle are marked, and so on.

SUMMARY

Therefore, it is an aspect of the present disclosure to provide a vehicle that may include a transmission apparatus capable of clearly distinguishing a difference between an automatic shifting operation and a manual shifting operation by dividing the operations into a laid-down (e.g., lie-flat) state of a shift lever and a standing-up (e.g., upright) state thereof, to prevent an erroneous operation of a driver. Additional aspects of the disclosure will be set forth in part in the description which follows and, in part, will be obvious from the description, or may be learned by practice of the disclosure.

In accordance with one aspect of the present disclosure, a vehicle may include a shift lever configured to receive a gear shift command, and a transmission apparatus configured to perform a gear shifting operation based on the gear shift command received by the shift lever, wherein the shift lever is rotatable to one side and configured to receive an automatic gear shift command in a laid-down state and to receive a manual shift command in a standing-up state.

The shift lever may be configured to move linearly in forward and backward directions (e.g., horizontal directions) and to receive a gear shift command. The vehicle may further include a connection device interlocked with the forward and backward movement of the shift lever and configured to transmit the gear shift command received by the shift lever. The connection device may include a first connecting member disposed to be interlocked with the forward and backward movement of the shift lever when the shift lever is in a laid-down state, and a second connecting member disposed to be interlocked with the forward and backward movement of the shift lever when the shift lever is in a standing state.

The shift lever may have a coupling protrusion for coupling with the first connecting member and the second connecting member, and the first connecting member and the second connecting member may respectively have a first coupling groove and a second coupling groove coupled with the coupling protrusion. The coupling protrusion may be coupled to the first coupling groove while the shift lever is in a laid-down state, and the coupling protrusion may be coupled to the second coupling groove while the shift lever is in a standing state. The first coupling protrusion may be simultaneously coupled to the first coupling groove and the second coupling groove while the shift lever is in a laid-down state, and the coupling protrusion may be coupled to the second coupling groove while the shift lever is in a standing state.

The connecting member may be disposed above the second connecting member, and the first connecting member and the second connecting member may be independently movable in the forward and backward directions. The shift lever may have a first coupling protrusion and a second coupling protrusion for coupling with the first connecting member and the second connecting member, and the first connecting member and the second connecting member may respectively have a first coupling groove and a second coupling groove coupled to the first coupling protrusion and the second coupling protrusion.

The first coupling protrusion may be coupled to the first coupling groove while the lever is in a laid-down state, and the second coupling protrusion may be coupled to the second coupling groove while the lever is in a standing state. The first connecting member may be disposed to surround at least two of side surfaces of the second connecting member, and the second connecting member may be restricted from moving in one direction of the first connecting member and may be interlocked therewith.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
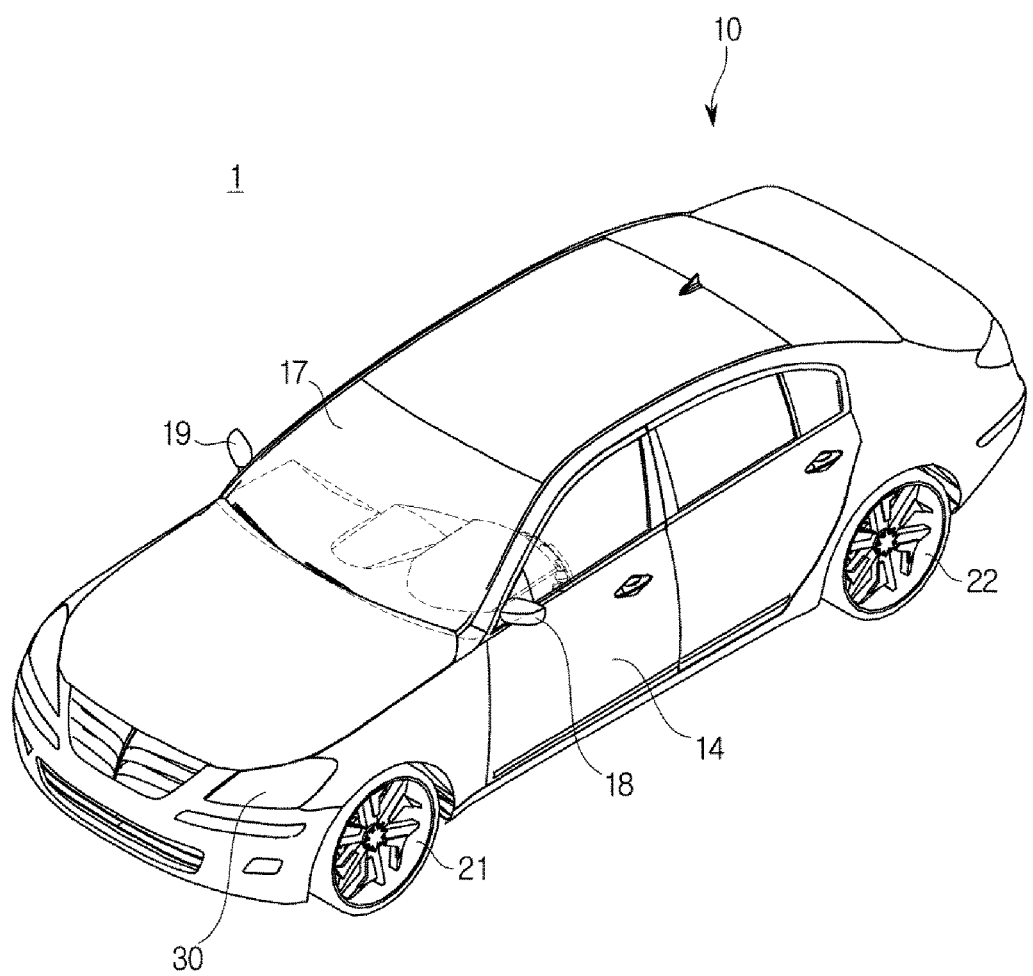
FIG. 1 is a view illustrating an exterior of a vehicle according to one exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments described in the specification and configurations illustrated in the drawings are simply exemplary embodiments of the present disclosure, and thus it should be understood that various modified examples which can replace them are present at the time when the present disclosure is filed. Further, the same reference numerals or symbols given in the various figures of the present specification indicate elements or components performing substantially the same function.

Also, the terms used herein are used to illustrate the exemplary embodiments and are not intended to limit and/or to restrict the described disclosure. The terms including ordinal numbers such as "first," "second," etc. can be used to describe various components, but the components are not limited by those terms. The terms are used merely for the purpose of distinguishing one component from another. For example, a first component may be called a second component, and similarly, a second component may be called a first component without departing from the scope of rights of the present disclosure. Meanwhile, the terms such as "front", "rear", "upper" and "lower" used in the following descriptions are defined on the basis of drawings, and a shape and a position of each element should not be limited by the terminology.

A vehicle to be described below refers to various devices configured to move an object to be transported, such as a person, a thing, or an animal, from a departure point to a destination. The vehicle may include an automobile configured to travel on a road or a track, a ship configured to move over the sea or a river, and an airplane configured to fly the sky using an action of the air. Further, the vehicle traveling on the road or the track may move in a predetermined direction in accordance with rotation of at least one wheel and may include, for example, a three- or four-wheeled vehicle, a construction machine, a two-wheeled vehicle, a prime mover, a bicycle, and a train traveling on the track.

Hereinafter, exemplary embodiments of the present disclosure will be described in detail with reference to the accompanying drawings. FIG. 1 is a view illustrating an exterior of a vehicle according to one embodiment of the present disclosure.

As illustrated in FIG. 1, one exemplary embodiment of a vehicle 1 may include a main body 10 configured to form an exterior of the vehicle 1, wheels 21 and 22 configured to move the vehicle 1, a door 14 configured to shield an interior of the vehicle 1 from the outside, a front glass 17 configured to provide a driver inside the vehicle 1 with a front view in the vehicle 1, and side mirrors 18 and 19 configured to provide the driver with a rear view in the vehicle 1.

The wheels 21 and 22 include front wheels 21 disposed at a front of the vehicle and rear wheels 22 disposed at a rear of the vehicle, and the front wheel 21 or the rear wheel 22 may move forward or backward by receiving a rotational force from a driving part 700 to be described later. The door 14 is rotatably disposed on left and right sides of the main body 10 to allow the driver to enter the vehicle 1 when the door 14 is open and to shield the interior of the vehicle 1 from the outside when the door 14 is closed.

The front glass 17 is disposed on a front upper side of the main body 10 to provide the driver inside the vehicle 1 front view information in the vehicle 1 and is also referred to as a windshield glass. Further, the side mirrors 18 and 19 include a left side mirror 18 disposed on a left side of the main body 10 and a right side mirror 19 disposed on the right side and enable the driver inside the vehicle 1 to obtain side and rear view information of the vehicle 1. Furthermore, a lamp 30 configured to ensure visibility or to guide a traveling route outside of the vehicle may be disposed on a front surface and/or a rear surface of the vehicle.

Figure 2:
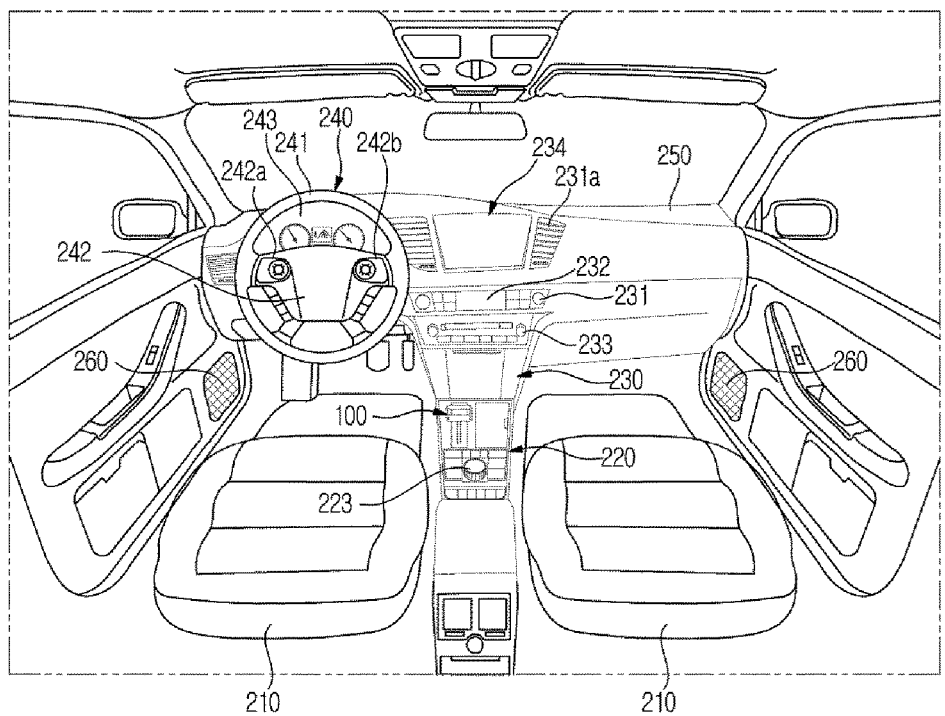
FIG. 2 is a view illustrating an internal configuration of the vehicle according to one exemplary embodiment of the present disclosure.

FIG. 2 is a view illustrating an internal configuration of the vehicle according to one exemplary embodiment of the present disclosure. As illustrated in FIG. 2, the vehicle 1 may include a seat 210, and a dashboard 250 in which a gear box 220, a center fascia 230, a steering wheel 240, and so on.

The steering wheel 240 disposed in the dashboard 250 is a device configured to adjust a movement direction of the vehicle 1 and may include a rim 241 grasped by the driver and a spoke 242 connected to a steering device of the vehicle 1 and connecting a hub of a rotating shaft for steering with the rim 241. According to the exemplary embodiment, operating devices 242a and 242b configured to operate various devices in the vehicle 1, for example an audio device and the like, may be formed in the spoke 242. An instrument cluster 243 may be configured to display a speed gauge that indicates a speed of the vehicle and a revolutions per minute (RPM) gauge that indicates an RPM of the vehicle. The driver may check information regarding the vehicle 1 at a glance. Further, the instrument cluster 243 may be configured to display information regarding the vehicle 1, in particular, information regarding the movement of the vehicle 1. For example, the instrument cluster 243 may be configured to display navigation information, audio information, a travelable distance based on a remaining fuel amount, and so on.

The instrument cluster 243 may be disposed in an area of the dashboard 250 facing the steering wheel 240 to allow the driver to confirm the information regarding the vehicle 1 without excessive deviation of from the front during driving. Although not illustrated in the drawings, a heads up display (HUD) configured to display visual information provided to the driver on the front glass 17 may be disposed in the dashboard 250. An air conditioner 231, a clock 232, an audio device 233, a display device 234, and so on may be installed in the center fascia 230 disposed on the dashboard 250.

The air conditioner 231 may be configured to adjust temperature, humidity, air cleanliness and air flow inside the vehicle 1 to maintain the interior of the vehicle 1 at a desired temperature. The air conditioner 231 may include at least one discharge port 231a disposed in the center fascia 230 to discharge air. A button or a dial configured to operate the air conditioner 231 or the like may be installed in the center fascia 230. A user such as the driver or the like may operate the air conditioner 231 using the button or other input device disposed on the center fascia 230.

The clock 232 may be disposed around the button or the dial configured to operate the air conditioner 231. The audio device 233 may include an operation panel having a plurality of buttons configured to perform functions of the audio device 233. The audio device 233 may provide a radio mode in which a radio function is provided and a media mode in which audio files of various storage media containing the audio files are reproduced. The audio device 233 may be configured to acoustically output the audio file through a speaker 260. In FIG. 2, an example in which the speaker 260 is provided inside the door is described, but a position in which the speaker 260 is provided is not limited thereto.

The display 234 may be configured to display a variety of information directly or indirectly related to the vehicle. For example, the display 234 may be configured to display directly related information such as navigation information of the vehicle and vehicle state information and indirect information such as multimedia information including photographs and moving pictures provided from inside and outside of the vehicle. Accordingly, the display 234 may be implemented using a liquid crystal display (LCD), light emitting diodes (LED), a plasma display panel (PDP), organic light emitting diodes (OLED), a cathode ray tube (CRT) and so on, but is not limited thereto. A transmission system 100 configured to shift gears in the vehicle 1 and a dial operating part 223 configured to execute functions of the vehicle 1 may be installed in the gear box 220.

Figure 3:
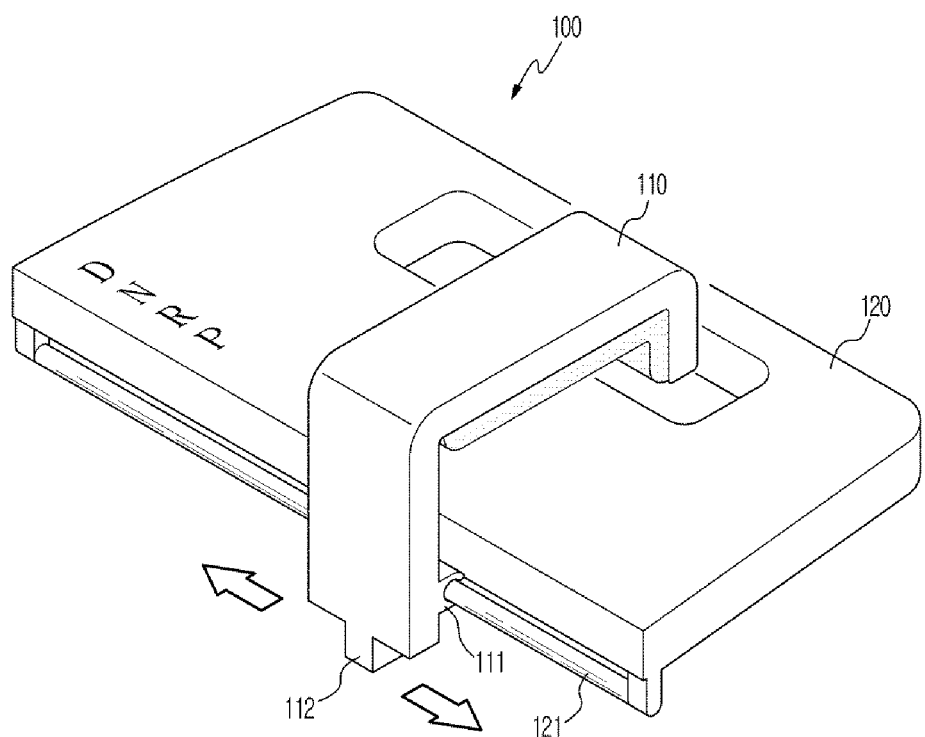
FIG. 3 is a view illustrating a state in which a transmission system is in an automatic shifting state in a vehicle according to one exemplary embodiment of the present disclosure.
Figure 4:
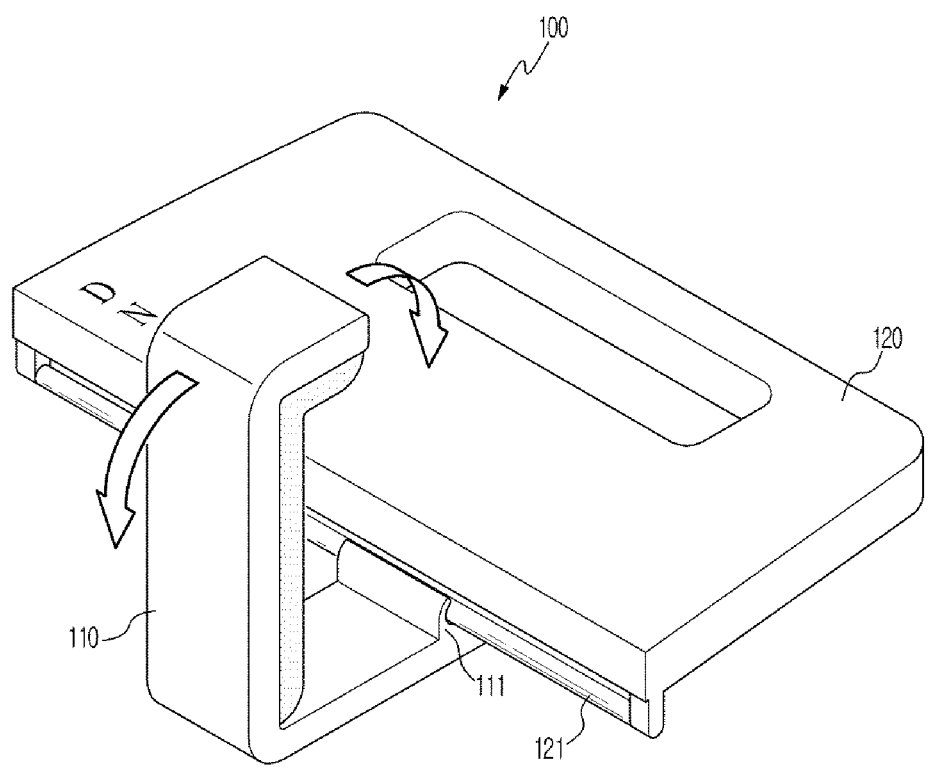
FIG. 4 is a view illustrating a state in which the transmission system is in a manual shifting state in the vehicle according to one exemplary embodiment of the present disclosure.
Figure 5:
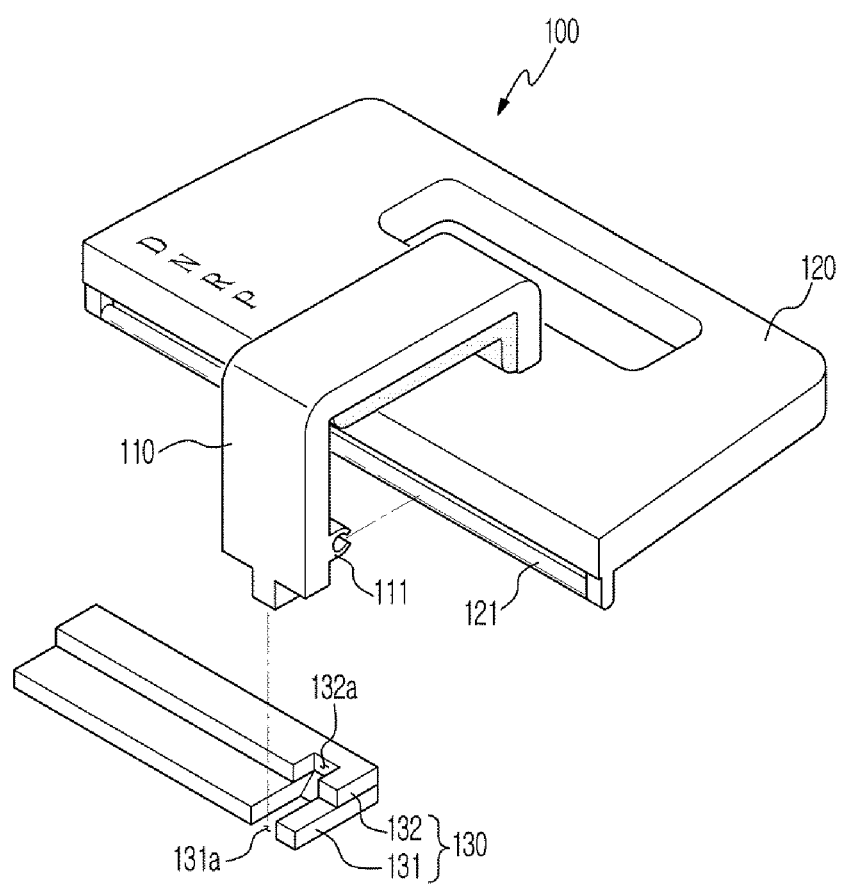
FIG. 5 is a detailed view of the transmission system in the vehicle according to one exemplary embodiment of the present disclosure.

Hereinafter, the vehicle 1 including the transmission system 100 capable of performing an automatic shifting operation and a manual shifting operation will be described in detail. FIG. 3 is a view illustrating a state in which the transmission system is in an automatic shifting state in the vehicle according to one exemplary embodiment of the present disclosure, FIG. 4 is a view illustrating a state in which the transmission system is in a manual shifting state in the vehicle according to one exemplary embodiment of the present disclosure, FIG. 5 is a detailed view of the transmission system in the vehicle according to one exemplary embodiment of the present disclosure, FIG. 6 is a cross-sectional view illustrating an inside of the transmission system when the transmission system is in the automatic shifting state in the vehicle according to the exemplary embodiment of the present disclosure, and FIG. 7 is a cross-sectional view illustrating an inside of the transmission system when the transmission system is in the manual shifting state in the vehicle according to the exemplary embodiment of the present disclosure.

The vehicle 1 according to one exemplary embodiment of the present invention may include the transmission system 100 configured to receive a gear shift command, and a transmission apparatus (not illustrated) configured to perform gear-shifting based on the gear shift command received by the transmission system 100. The transmission system 100 may include a shift lever 110 configured to receive the gear shift command and a cover 120 in which the shift lever 110 is installed. The shift lever 110 may be formed in a curved c-shape having, and a coupling portion 111 for coupling with the cover 120 may be disposed at one end of the shift lever 110.

The cover 120 forms an exterior of the transmission system 100 and may include a guide shaft 121 configured to guide an operation of the shift lever 110. The coupling portion 111 may be open at one side thereof so that the guide shaft 121 is coupled thereto and may be provided to surround the guide shaft 121. The guide shaft 121 may be formed to extend in forward and backward directions and to guide the shift lever 110 to move linearly in the forward and backward directions for an operation of a gear shift stage of the shift lever 110. Therefore, when the coupling portion 111 is coupled to the guide shaft 121, the shift lever 110 may move linearly in the forward and backward directions and may be configured to rotate in a lateral direction perpendicular to the forward and backward directions.

Figure 6:
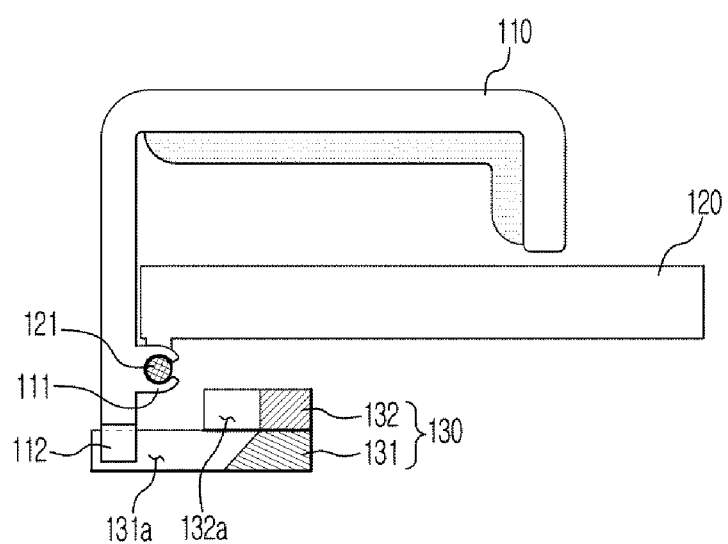
FIG. 6 is a cross-sectional view illustrating an inside of the transmission system when the transmission system is in the automatic shifting state in the vehicle according to the exemplary embodiment of the present disclosure.
Figure 7:
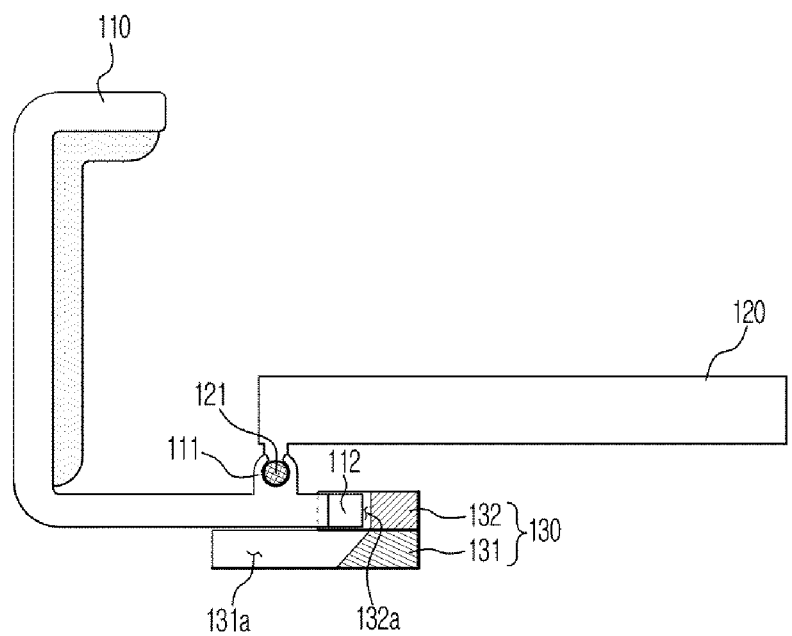
FIG. 7 is a cross-sectional view illustrating an inside of the transmission system when the transmission system is in the manual shifting state in the vehicle according to the exemplary embodiment of the present disclosure.

As illustrated in FIGS. 3 and 6, the shift lever 110 may move linearly while in a laid-down state (e.g., a flat, horizontal, or collapsed state) and may be configured to receive an automatic gear shift command According to one exemplary embodiment, the automatic shift lever 110 may be movable forward or backward and may alternatively be movable in a lateral direction. The shift lever 110 may be disposed at any one of a plurality of gear shift stages. The plurality of gear shift stages may include park (P), reverse (R), neutral (N), and drive (D) stages. Alternatively, the plurality of gear shift stages may include only some of the P, R, N, and D stages, or may further include other gear shift stages. For example, the P-stage may be provided as a separate button, and the shift lever 110 may be disposed at any one of the R, N, and D stages.

As illustrated in FIGS. 4 and 7, the shift lever 110 may move linearly while in a standing state (e.g., upright or engaged state) to receive a manual shift command. According to one exemplary embodiment, the automatic shift lever 110 may be rotatable in the lateral direction and may alternatively be rotatable in the forward and backward directions. A shift operation of upshifting (+) or downshifting (−) may be performed by linearly moving the shift lever 110 in the forward and backward directions when the shift lever 110 has been rotated and is in a standing state. A connection device 130 interlocked with the forward/backward movement of the shift lever 110 and configured to transmit the gear shift command input to the shift lever may be disposed below the cover 120. The connection device 130 may be movable in the forward and backward direction and may also be movable in the forward and backward directions in conjunction with the forward and backward movement of the shift lever 110 while coupled with the shift lever 110.

According to one exemplary embodiment, the connection device 130 may include a first connecting member 131 configured to transmit an automatic gear shift command and a second connecting member 132 configured to transmit a manual shift command. The first connecting member 131 and the second connecting member 132 may be independently movable in the forward and backward directions.

The first connecting member 131 may have a first coupling groove 131a for coupling with the shift lever 110, and the second connecting member 132 may also have a second coupling groove 132a for coupling with the shift lever 110. The first coupling groove 131a and the second coupling groove 132a for coupling with a coupling protrusion 112 of the shift lever 110, which will be described later, may be formed long in an axial direction which is a rotational direction of the shift lever 110 to insert the coupling protrusion 112 thereinto according to rotation of the shift lever 110.

The first connecting member 131 may be disposed below the second connecting member 132, and the first connecting member 131 and the second connecting member 132 may be disposed to form a stepped structure. Therefore, while the shift lever 110 is in a laid-down state as illustrated in FIGS. 3 and 6, the coupling protrusion 112 may be inserted into the first coupling groove 131a of the first connecting member 131. In particular, when the shift lever 110 moves linearly, the first connecting member 131 may also move linearly, and when a position change due to the linear movement of the first connecting member 131 is recognized by a controller (not illustrated), the gear shift stage of the automatic transmission apparatus may be changed.

The second connecting member 132 may be disposed below the first connecting member 131. Therefore, while the shift lever 110 is in a standing state as illustrated in FIGS. 4 and 7, the coupling protrusion 112 may be inserted into the second coupling groove 132a of the second connecting member 132. In particular, when the shift lever 110 moves linearly in the forward and backward directions, the second connecting member 132 may also move linearly, and when the position change due to the linear movement of the second connecting member 132 is recognized by the controller (not illustrated), the shift operations of upshifting (+) or downshifting (−) may be performed.

Figure 8:
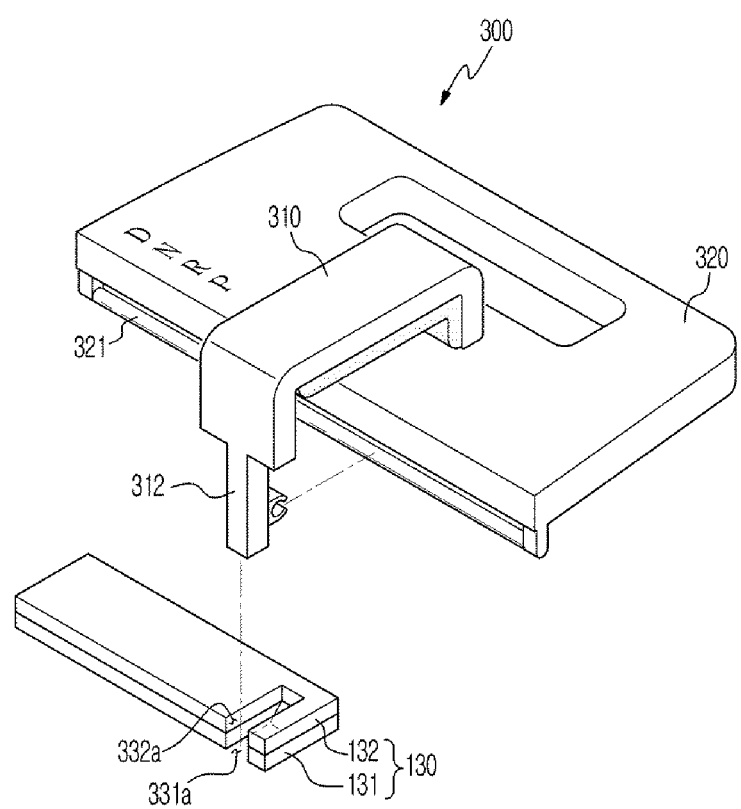
FIG. 8 is a view illustrating a transmission system according to another exemplary embodiment of the present disclosure.
Figure 9:
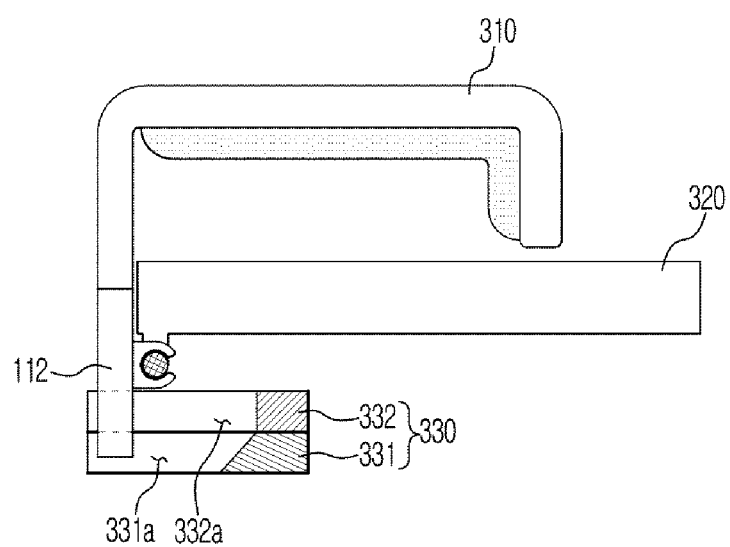
FIG. 9 is a cross-sectional view illustrating an inside of the transmission system when the transmission system of FIG. 8 is in the automatic shifting state according to an exemplary embodiment of the present disclosure.
Figure 10:
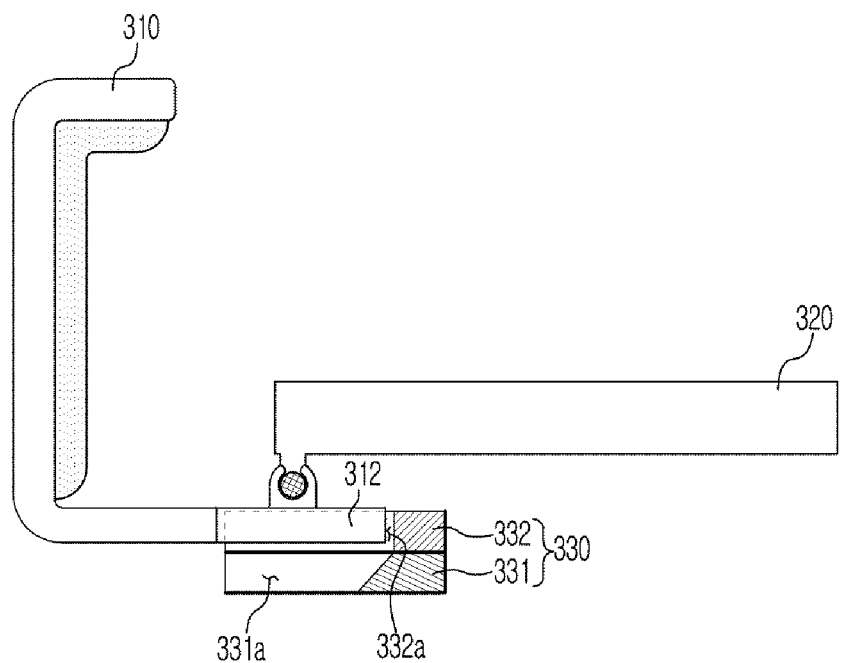
FIG. 10 is a cross-sectional view illustrating an inside of the transmission system when the transmission system of FIG. 8 is in the manual shifting state according to an exemplary embodiment of the present disclosure.

FIG. 8 is a view illustrating a transmission system according to another exemplary embodiment of the present disclosure, FIG. 9 is a cross-sectional view illustrating an inside of the transmission system when the transmission system of FIG. 8 is in the automatic shifting state, and FIG. 10 is a cross-sectional view illustrating an inside of the transmission system when the transmission system of FIG. 8 is in the manual shifting state.

A transmission system 300 may include a shift lever 310 to which a gear shift command is input and a cover 320 in which the shift lever 310 is installed. A coupling structure of the shift lever 310 and the cover 320 may be the same as that in the above-described exemplary embodiment. However, structures of a coupling protrusion 312 disposed on the shift lever 310 and a connection device 330 coupled to the coupling protrusion 312 are different from those of the previous exemplary embodiment.

Specifically, the coupling protrusion 312 may be provided to be longer than the coupling protrusions 112 of the previous exemplary embodiment, and a first connecting member 331 and a second connecting member 332 may be disposed to vertically overlap each other. Therefore, as illustrated in FIG. 9, when the driver lays down or folds down the shift lever 310 for automatic shifting operation, the coupling protrusion 312 may be simultaneously coupled to a first coupling groove 331a of the first connecting member 331 and a second coupling groove 332a of the second connecting member 332b. In particular, when the shift lever 310 moves linearly in the forward and backward directions, the first connecting member 331 and the second connecting member 332 may move linearly together in the forward and backward directions, and when a position change due to the linear movement of the first connecting member 331 and the second connecting member 332 is recognized by a controller (not illustrated), a gear shift stage of an automatic transmission apparatus may be changed.

While the shift lever 310 is in a standing state as illustrated in FIG. 10, the coupling protrusion 312 may be inserted into the second coupling groove 332a of the second connecting member 332. In particular, when the shift lever 310 moves linearly in the forward and backward directions, the second connecting member 332 may move linearly, and when the position change due to the linear movement of only the second connecting member 332 is recognized by the controller (not illustrated), a shift operation of upshifting (+) or the downshifting (−) may be performed.

Figure 11:
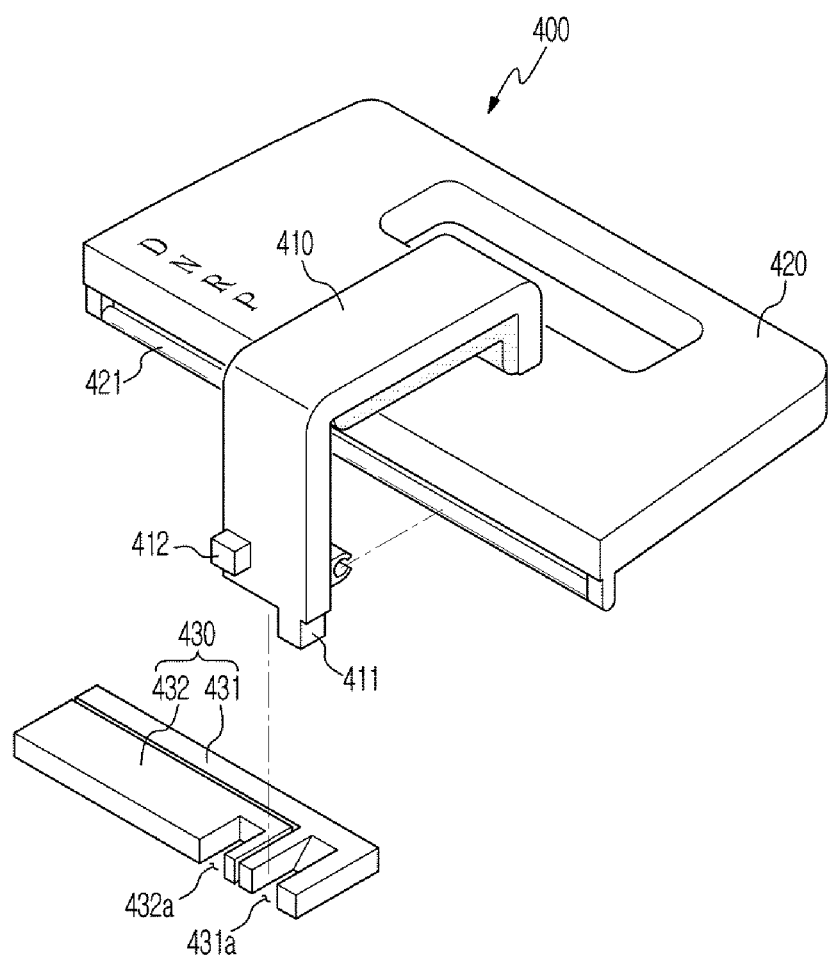
FIG. 11 is a view illustrating a transmission system according to still another exemplary embodiment of the present disclosure.
Figure 12:
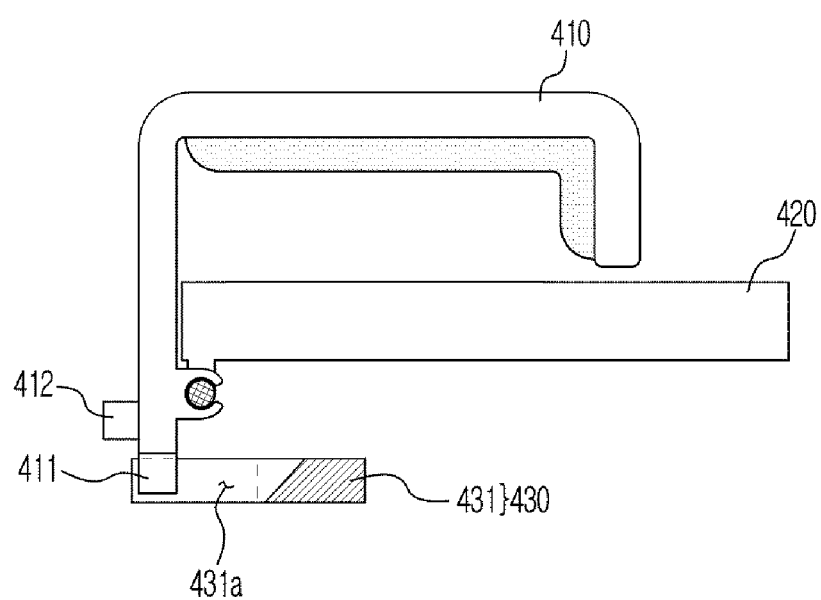
FIG. 12 is a cross-sectional view illustrating an inside of the transmission system when the transmission system of FIG. 11 is in the automatic shifting state according to an exemplary embodiment of the present disclosure.
Figure 13:
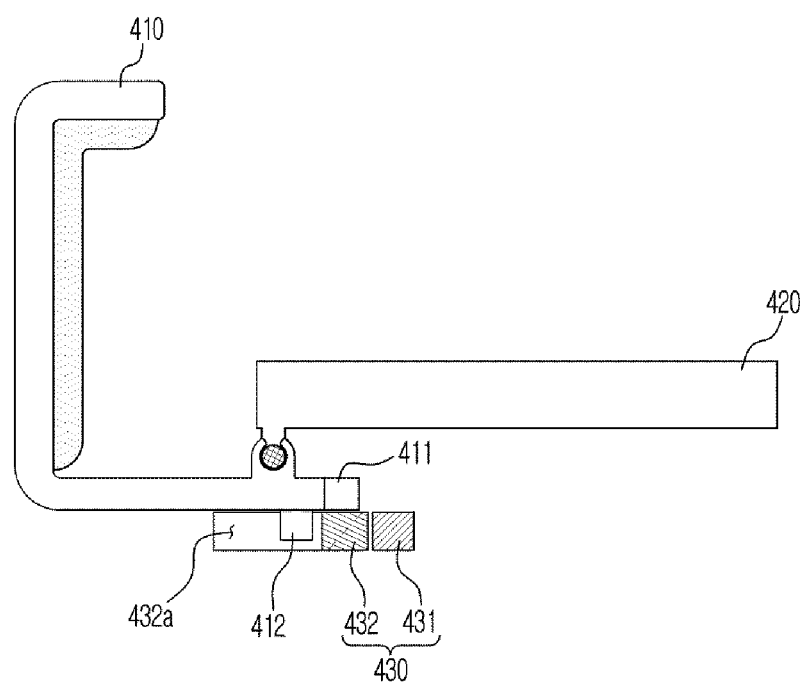
FIG. 13 is a cross-sectional view illustrating an inside of the transmission system when the transmission system of FIG. 11 is in the manual shifting state according to an exemplary embodiment of the present disclosure.

FIG. 11 is a view illustrating a transmission system according to still another exemplary embodiment of the present disclosure, FIG. 12 is a cross-sectional view illustrating an inside of the transmission system when the transmission system of FIG. 11 is in the automatic shifting state, and FIG. 13 is a cross-sectional view illustrating an inside of the transmission system when the transmission system of FIG. 11 is in the manual shifting state.

A transmission system 400 may include a shift lever 410 to which a gear shift command is input, and a cover 420 in which the shift lever 410 is installed. A coupling structure of the shift lever 410 and the cover 420 may be the same as that in the above-described exemplary embodiment. However, structures of a coupling protrusions 412 and 413 disposed on the shift lever 410 and a connection device 430 coupled to the coupling protrusions 412 and 413 are different from those of the previous exemplary embodiment.

Particularly, one pair of coupling protrusions 412 and 413 capable of being coupled to a first coupling groove 431a of a first connecting member 431 and a second coupling groove 432b of a second connecting member 432 may be formed. The coupling protrusion 412 and 413 may include a first coupling protrusion 412 coupled to the first coupling groove 431a while the shift lever is in a laid-down state as illustrated in FIG. 12, and may include a second coupling protrusion 413 coupled to the second coupling groove 432a while the shift lever is in a standing state as illustrated in FIG. 13.

While the shift lever 410 is in a laid-down state as illustrated in FIG. 12, the first coupling protrusion 412 may be formed to protrude downward, and the second coupling protrusion 413 may be formed to protrude axially. Further, the first coupling protrusion 412 and the second coupling protrusion 413 may be spaced apart from each other in an axial direction of a guide shaft 421. The first connecting member 431 and the second connecting member 432 may be disposed on the same plane, and the first connecting member 431 may be disposed to surround a part of side surfaces of the second connecting member 432 and the second connecting member 432 may be restricted from moving in one direction of the first connecting member 431 and to be interlocked therewith.

Therefore, as illustrated in FIG. 12, when the driver lays down the shift lever 410 for the automatic shifting operation, the first coupling protrusion 412 may be coupled to a first coupling groove 431a of the first connecting member 431. In particular, when the shift lever 410 moves in the forward and backward directions, the first connecting member 431 and the second connecting member 432 may move linearly together in the forward and backward directions, and when a position change due to the linear movement of the first connecting member 431 and the second connecting member 432 is recognized by a controller (not illustrated), a gear shift stage of an automatic transmission apparatus may be changed.

Furthermore, while the shift lever 410 is in a standing state as illustrated in FIG. 10, the second coupling protrusion 413 may be inserted into the second coupling groove 432a of the second connecting member 432. In particular, when the shift lever 410 moves linearly in the forward and backward directions, the second connecting member 432 may also move linearly, and when the position change due to the linear movement of the second connecting member 432 is recognized by the controller (not illustrated), a shift operation of upshifting (+) or downshifting (−) may be performed.

According to the spirit of the present disclosure, it may be possible to provide a vehicle including the transmission apparatus wherein it is possible to clearly distinguishing a difference between the automatic shifting operation and the manual shifting operation by dividing the operations in which the shift lever is in a laid-down state and an operation in which the shift lever is in a standing-state, thereby preventing an erroneous operation of the driver.

Although the technical idea of the present disclosure has been described above with reference to the exemplary embodiments, the scope of the present disclosure is not limited to these exemplary embodiments. It would be appreciated by those skilled in the art that changes may be made in these exemplary embodiments without departing from the principles and spirit of the disclosure, the scope of which is defined in the claims and their equivalents.

What is claimed is:

1. A vehicle, comprising:
a shift lever configured to receive a gear shift command; and
a transmission apparatus configured to perform a gear shifting operation based on the gear shift command received by the shift lever,
wherein the shift lever is rotatable to one side and is configured to receive an automatic gear shift command in a laid-down state and to receive a manual shift command in a standing state,
wherein the shift lever is configured to move linearly in forward and backward directions and to receive a gear shift command, a connection device interlocked with the forward and backward movement of the shift lever and configured to transmit the gear shift command received by the shift lever,
wherein the connection device includes:
a first connecting member interlocked with the forward and backward movement of the shift lever when the shift lever is in the laid-down state; and
a second connecting member interlocked with the forward and backward movement of the shift lever when the shift lever is in the standing state,
wherein the shift lever has a coupling protrusion for coupling with the first connecting member and the second connecting member, and the first connecting member and the second connecting member respectively have a first coupling groove and a second coupling groove coupled with the coupling protrusion,
wherein the coupling protrusion is coupled to the first coupling groove while the shift lever is in the laid-down state, and the coupling protrusion is coupled to the second coupling groove while the shift lever is in the standing state, and
wherein the first connecting member is disposed above the second connecting member, and the first connecting member and the second connecting member are independently movable in the forward and backward directions.

2. A vehicle comprising,
a shift lever configured to receive a gear shift command; and a transmission apparatus configured to perform a gear shifting operation based on the gear shift command received by the shift lever, wherein the shift lever is rotatable to one side and is configured to receive an automatic gear shift command in a laid-down state and to receive a manual shift command in a standing state, wherein the shift lever is configured to move linearly in forward and backward directions and to receive a gear shift command, a connection device interlocked with the forward and backward movement of the shift lever and configured to transmit the gear shift command received by the shift lever, wherein the connection device includes:
- a first connecting member interlocked with the forward and backward movement of the shift lever when the shift lever is in the laid-down state; and
- a second connecting member interlocked with the forward and backward movement of the shift lever when the shift lever is in the standing state, wherein the shift lever has a first coupling protrusion and a second coupling protrusion for coupling with the first connecting member and the second connecting member, respectively, and the first connecting member and the second connecting member respectively have a first coupling groove and a second coupling groove coupled to the first coupling protrusion and the second coupling protrusion.

3. The vehicle according to claim 2, wherein the first coupling protrusion is coupled to the first coupling groove while the shift lever is in the laid-down state, and the second coupling protrusion is coupled to the second coupling groove while the shift lever is in the standing state.

4. The vehicle according to claim 3, wherein the first connecting member is disposed to surround at least two side surfaces of the second connecting member, and the second connecting member is restricted from moving in one direction of the first connecting member and is interlocked therewith.

\* \* \* \* \*